US007119955B1

(12) United States Patent
Sigler et al.

(10) Patent No.: US 7,119,955 B1
(45) Date of Patent: Oct. 10, 2006

(54) MULTI-APERTURE HIGH-FILL FACTOR TELESCOPE

(75) Inventors: Robert Dayton Sigler, Cupertino, CA (US); Alice Louise Palmer, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 105 days.

(21) Appl. No.: 10/803,786

(22) Filed: Mar. 17, 2004

Related U.S. Application Data

(63) Continuation-in-part of application No. 10/206,087, filed on Jul. 29, 2002.

(51) Int. Cl.
*G02B 23/00* (2006.01)

(52) U.S. Cl. .................... 359/423; 359/398; 359/434

(58) Field of Classification Search ................ 359/398, 359/430, 434, 435, 407–412, 629–631, 423
See application file for complete search history.

(56) References Cited

U.S. PATENT DOCUMENTS

| 4,856,884 A | 8/1989 | Fender et al. |
| 4,953,964 A | 9/1990 | Anafi et al. |
| 5,282,082 A | 1/1994 | Espie et al. |
| 5,291,333 A | 3/1994 | Mills et al. |
| 5,898,529 A | 4/1999 | Meyer et al. |
| 5,905,591 A * | 5/1999 | Duncan et al. ............. 359/399 |

OTHER PUBLICATIONS

T. W. Stuhlinger, "All-Reflective Phased Array Imaging Telescopes," International Lens Design Conference, G.N. Lawrence, ed., Proc. Soc. Photo-Opt. Instrumentation Eng. 1354, pp. 438-446 (1990).
T. W. Stuhlinger, "All-Reflective Phased Array Imaging Telescopes," International Lens Design Conference, G.N. Lawrence, ed., Proc. Soc. Photo-Opt. Instrumentation Eng. 1354, pp. 438-446 (1990).

* cited by examiner

*Primary Examiner*—Drew A. Dunn
*Assistant Examiner*—Josual L Pritchett
(74) *Attorney, Agent, or Firm*—McDermott Will & Emery LLP

(57) ABSTRACT

A multi-aperture high-fill-factor telescope is provided. Specifically a multi-aperture high-fill-factor telescope is provided that includes a plurality of sub-aperture telescopes, each sub-aperture telescope being configured to collect electromagnetic radiation from a scene and including first, second, third, and fourth powered mirrors; a set of combiner optics configured to combine electromagnetic radiation collected by the sub-aperture telescopes to form an image of the scene; and a plurality of sets of relay optics, the sets of relay optics are respectively associated with the sub-aperture telescopes and each set of relay optics includes a first flat fold mirror, a trombone mirror pair, and a last flat fold mirror, wherein the last flat fold mirrors are disposed within about a beam diameter of respective exit pupils of the sub-aperture telescopes.

10 Claims, 17 Drawing Sheets

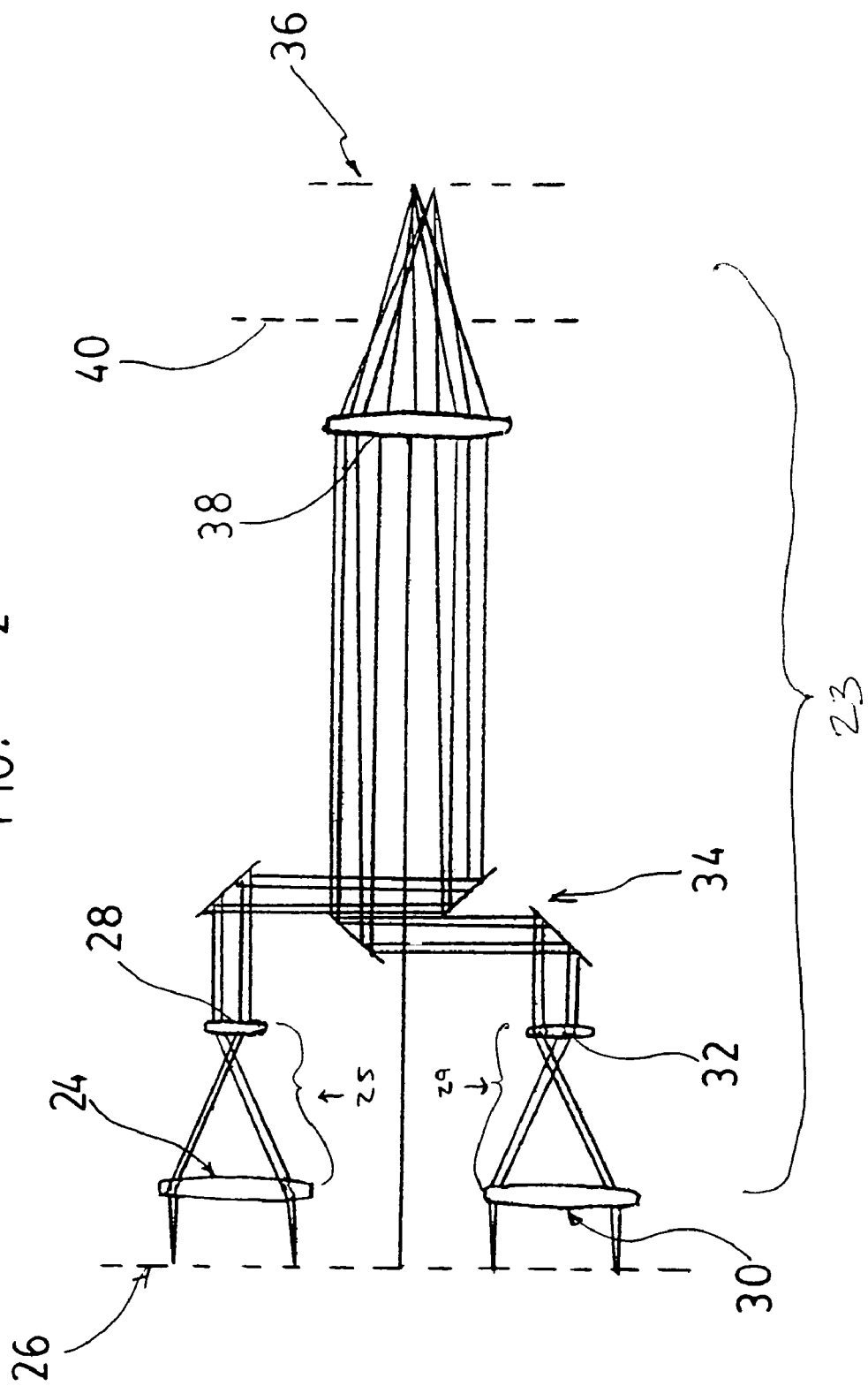

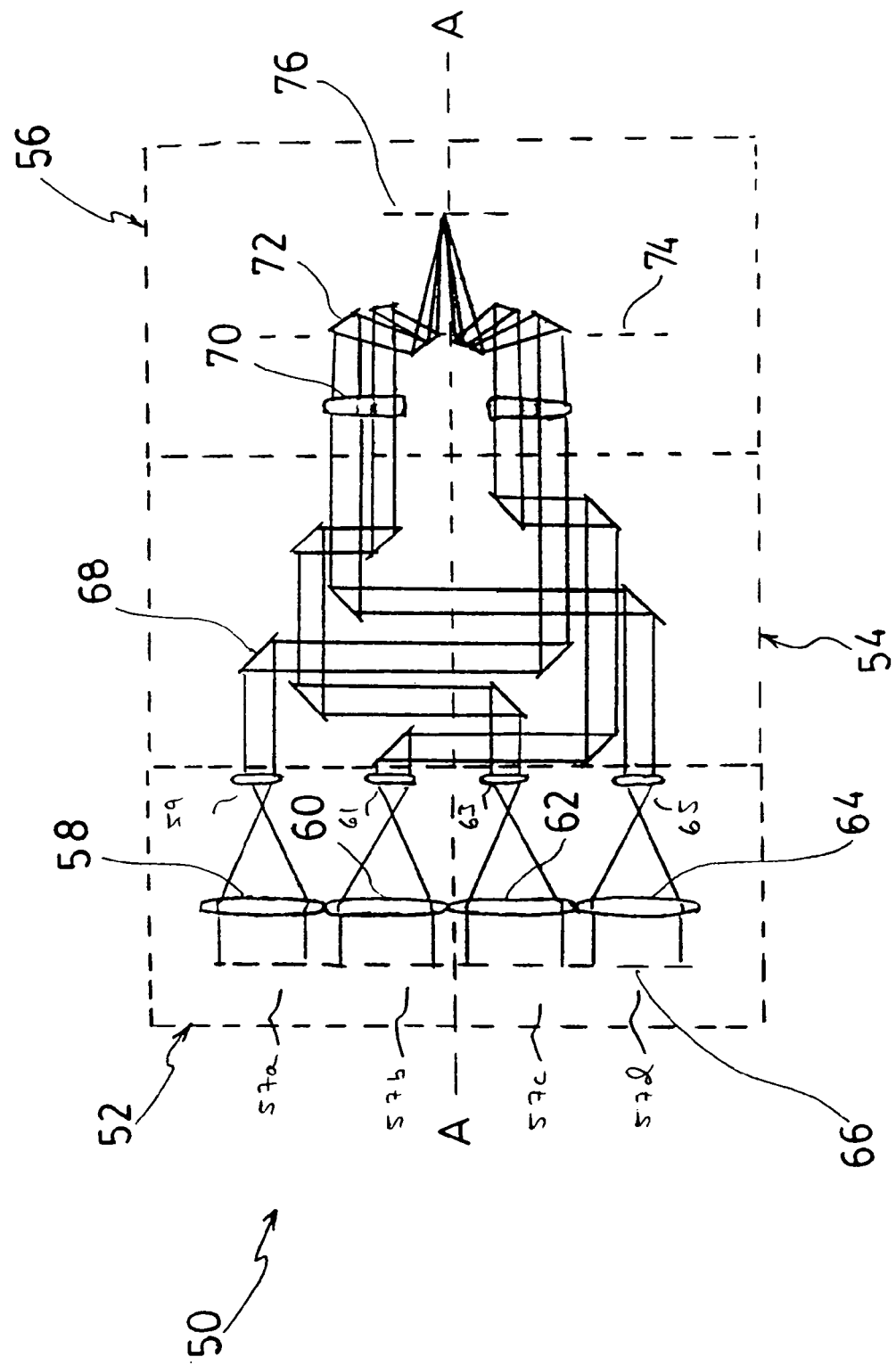

MULTI-APERTURE HIGH-FILL FACTOR TELESCOPE

CROSS-REFERENCES TO RELATED APPLICATIONS

This application is a continuation-in-part of U.S. patent application Ser. No. 10/206,087, filed Jul. 29, 2002, of Sigler et al., titled Multi-Aperture High Fill Factor Telescope, and is incorporated by reference herein in its entirety for all purposes.

BACKGROUND OF THE INVENTION

The present invention relates generally to telescopes. More particularly, the present invention relates to a multi aperture telescope having a high fill factor.

Traditional telescopes often include a single collecting element (configured to collect electromagnetic radiation from a scene) and one or more secondary reflectors (configured to focus the collected electromagnetic radiation on an image plane). The first collecting element of a traditional telescope is typically disposed at the telescope's entrance pupil. An example of a typical refractor telescope 5 is shown in FIG. 1. Refractor telescope 5 includes a primary lens 10 disposed near an entrance pupil 12 and includes two smaller relay lenses 14 and 16. Primary lens 10 is configured to form an intermediate image of a scene at an intermediate image plane 18. Relay lens 14 is configured to collimate the collected electromagnetic radiation and transmit the electromagnetic radiation to relay lens 16. Relay lens 16 is configured to focus the collected electromagnetic radiation on an image plane 22. A real exit pupil 20 (an image of the entrance pupil) is positioned optically upstream of image plane 22. Refractor telescopes are typically relatively heavy due in part to the large amounts of glass used to form the refractive optical elements of such telescopes. Accordingly, refractor telescopes are generally not used for space-based applications, as the cost of launching such heavy telescopes is excessive. Moreover, refractive elements tend to become fogged in space deployment due to the cosmic particles that strike the refractive elements. Fogging tends to limit the amount of time refractive telescopes are useful in space applications.

As telescope systems are made larger, to achieve high resolution and to collect more light, a point is eventually reached where the size of the telescope elements, especially the primary mirror, exceeds the current state of the art in fabrication and mechanical support. One solution for overcoming this shortcoming, is to segment the primary mirrors into manageable pieces. For example, segmented elements forming a primary mirror can be made collectively lighter than a monolithic primary mirror. Another solution for overcoming the shortcomings of large traditional telescopes, is to form the telescope from a number of sub-aperture telescopes. Such telescope arrays are often referred to as multi-aperture telescope arrays.

FIG. 2 shows a cross-sectional view of an exemplary multi-aperture telescope 23. Multi-aperture telescope 23 includes first and second sub-aperture telescopes 25 and 29, respectively, which are disposed near an entrance pupil 26. First sub-aperture telescope 25 includes a primary element 24 and a secondary element 28, and second sub-aperture telescope 29 similarly includes a primary element 30 and a secondary element 32. Light collected by the sub-aperture telescopes is coherently combined at an image plane 36 (disposed behind an exit pupil 40) by a combiner lens 38. A set of flat fold mirrors 34 is configured to direct collected electromagnetic radiation to a combiner lens 38. Multi-aperture telescope 23 is an example of a sparse array telescope. That is, the fill factor of multi-aperture telescope 29 is less than about 50%. Fill factor may be defined as the percentage of electromagnetic radiation collected by the array of sub-aperture telescopes that enters an encircling entrance pupil of a multi-aperture telescope. Typical sparse array telescope designs, such as multi-aperture telescope 23, have relatively large spacings between sub-aperture telescopes to provide light beam clearance at the telescopes' combiner planes to prevent vignetting and optical element interference.

A need exists for a multi-aperture telescope having a high fill factor (e.g., larger than about 50%) so that relatively large amounts of electromagnetic radiation from scenes may be collected to form images of the scenes.

BRIEF SUMMARY OF THE INVENTION

The present invention provides a telescope. More particularly, the present invention provides a multi-aperture telescope array having a high fill factor.

According to a multi-aperture telescope embodiment of the present invention, a plurality of collector sub-aperture telescopes have real-exit pupils that coincide with a last flat fold mirror in a relay group. The final flat fold mirror is configured to direct collected electromagnetic radiation into a combiner telescope. The exit pupils of the collector sub-aperture telescopes are also the entrance pupil of the combiner telescope.

According to another embodiment, a multi-aperture high-fill-factor telescope includes a plurality of sub-aperture telescopes, each sub-aperture telescope being configured to collect electromagnetic radiation from a scene and including first, second, third, and fourth powered mirrors; a set of combiner optics configured to combine electromagnetic radiation collected by the sub-aperture telescopes to form an image of the scene; and a plurality of sets of relay optics, the sets of relay optics are respectively associated with the sub-aperture telescopes and each set of relay optics includes a first flat fold mirror, a trombone mirror pair, and a last flat fold mirror, wherein the last flat fold mirrors are disposed within about a beam diameter of respective exit pupils of the sub-aperture telescopes. According to a specific embodiment, the last flat fold mirrors are disposed substantially symmetrically about a central axis. According to a specific embodiment, the first and second powered mirrors of the sub-aperture telescopes form a first Cassegrain telescope and each third and fourth powered mirrors of the sub-aperture telescopes form a second Cassegrain telescope. According to another specific embodiment, the first and second powered mirrors of the sub-aperture telescopes form a Gregorian telescope and each third and fourth powered mirrors of the sub-aperture telescopes form a Cassegrain telescope. According to another specific embodiment, the first and second powered mirrors of the sub-aperture telescopes form a Cassegrain telescope and each third and fourth powered mirrors of the sub-aperture telescopes form a Gregorian telescope.

According to another embodiment, a multi-aperture high-fill-factor telescope includes a plurality of sub-aperture telescopes, each sub-aperture telescope including at least first, second, third, and fourth powered mirrors and an exit pupil disposed optically remote from an associated sub-aperture telescope; a plurality of sets of relay optics disposed optically downstream from the plurality of sub-aperture telescopes, and each set of relay optics includes a first flat fold mirror, a trombone mirror pair, and a last flat fold mirror, wherein each last flat fold mirror is disposed within about a beam diameter of an associated exit pupil; and a combiner telescope disposed optically downstream from the sets of relay optics. According to a specific embodiment, the exit pupils are located about at an entrance pupil of the combiner telescope. According to another specific embodiment, the multi-aperture high-fill-factor telescope is configured to be deployed in space.

Numerous benefits may be achieved using the present invention over conventional techniques. For example, the invention provides telescopes having relatively large entrance pupils and relatively low weight for low cost space deployment. Moreover, as the invention provides relatively large entrance pupil telescopes, relatively high resolution of scenes may be achieved. Depending upon the specific embodiment, there can be one or more of these benefits. These and other benefits can be found throughout the present specification and more particularly below.

A further understanding of the nature and advantages of the present invention may be realized by reference to the remaining portions of the specification and the drawings.

BRIEF DESCRIPTION OF THE DRAWINGS

FIG. 2 is a simplified schematic of a multi-aperture telescope having refractive optics and a relatively low fill factor;

FIG. 3 is a simplified schematic of a multi-aperture high-fill-factor telescope according to an embodiment of the present invention;

DETAILED DESCRIPTION OF THE INVENTION

Figure 1:
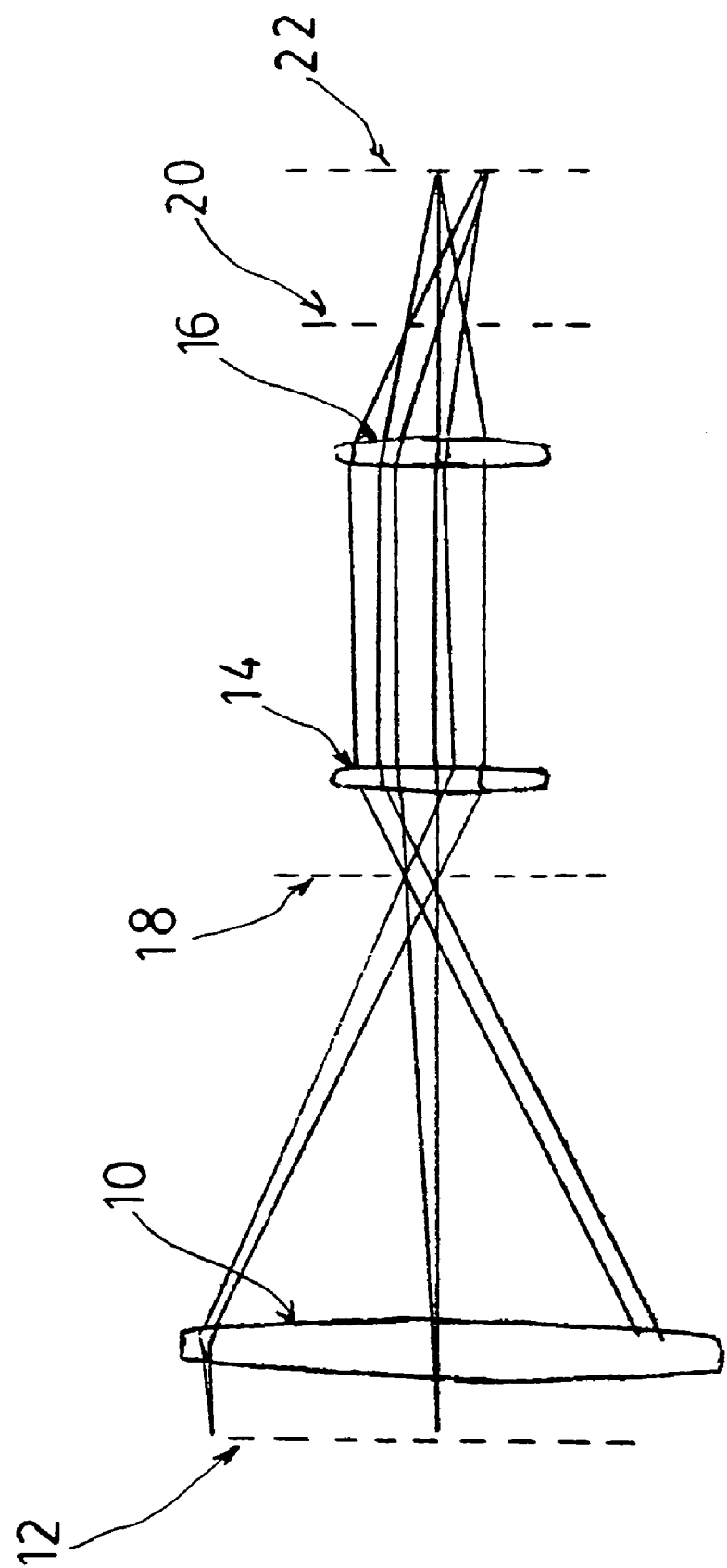
FIG. 1 is a simplified schematic of a large aperture telescope having refractive optics.

The present invention provides a telescope. More particularly, the present invention provides a multi-aperture telescope array having a high fill factor.

FIG. 3 is a simplified schematic of a multi-aperture high-fill-factor telescope 50 according to an embodiment the present invention and includes a collector section 52, a relay section 54, and a combiner section 56. The optical axis of the telescope system is designated by the dashed line A—A. Collector section 52 of the illustrated embodiment includes four sub-aperture telescopes 57a–57d employing refractive elements. Sub-aperture telescopes 57a–57d respectively include primary elements 58, 60, 62, and 64 that collectively define an entrance pupil 66 of telescope 50. Primary elements 58, 60, 62, and 64 are respectively associated with corresponding secondary elements 59, 61, 63, and 65. The secondary collectors are shown in the optical paths of the major rays of their associated primary collectors.

Relay section 54 includes a plurality of flat fold mirrors, such as flat fold mirror 68, for directing light from the sub-aperture telescopes to combiner section 56. Combiner section 56 includes a primary refractive element 70 and a plurality of flat fold mirrors 72, which combine light collected by sub-aperture telescopes 57a–57d at the exit pupil 74 and focus the combined light at the image plane 76.

Although the embodiment shown in FIG. 3 is shown with refractive elements in the collector section and the combiner section, it is understood that the general principals of the present invention apply to systems employing either refractive or reflective elements.

Figure 4A:
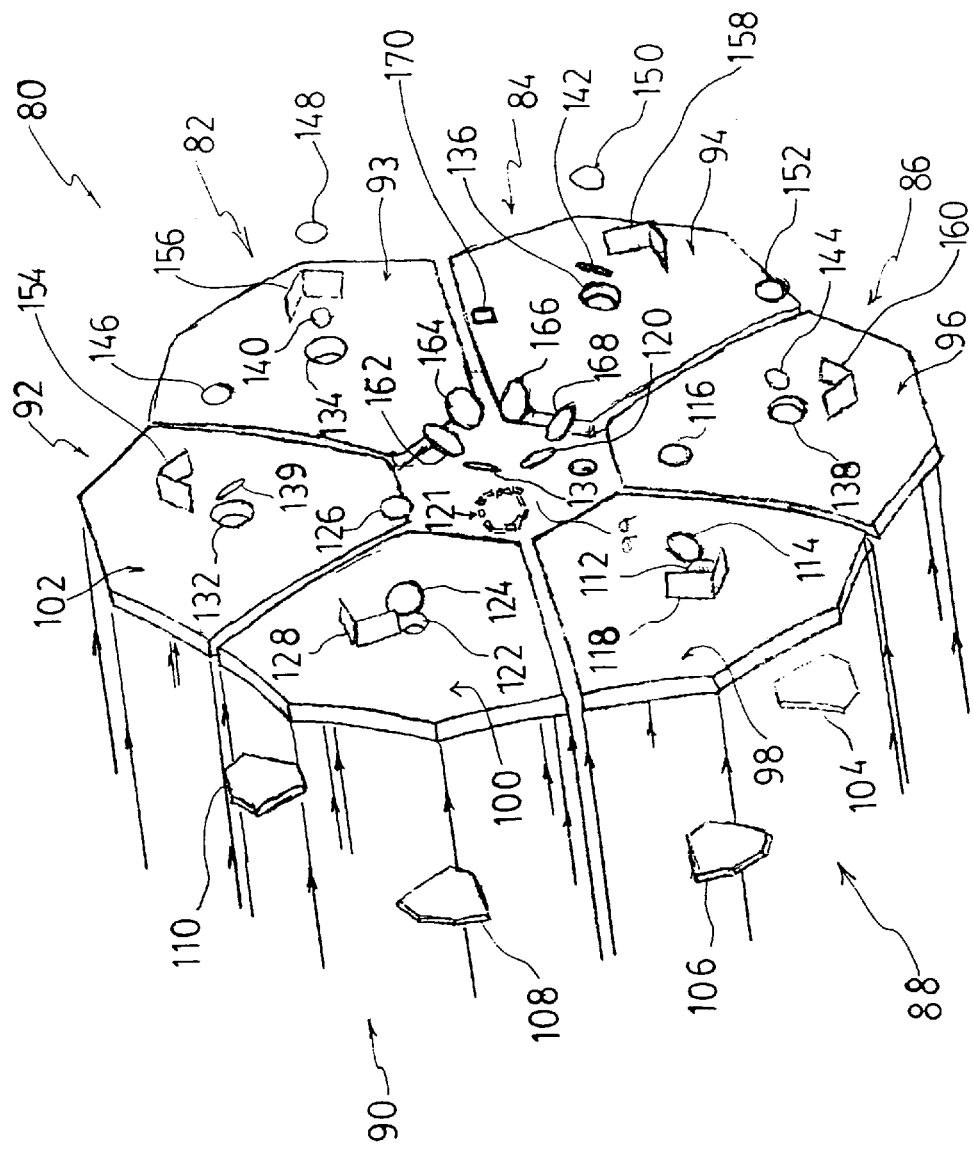
FIG. 4A shows an overall perspective view of a multi-aperture high-fill-factor telescope having reflective elements according to an embodiment of the present invention.
Figure 4B:
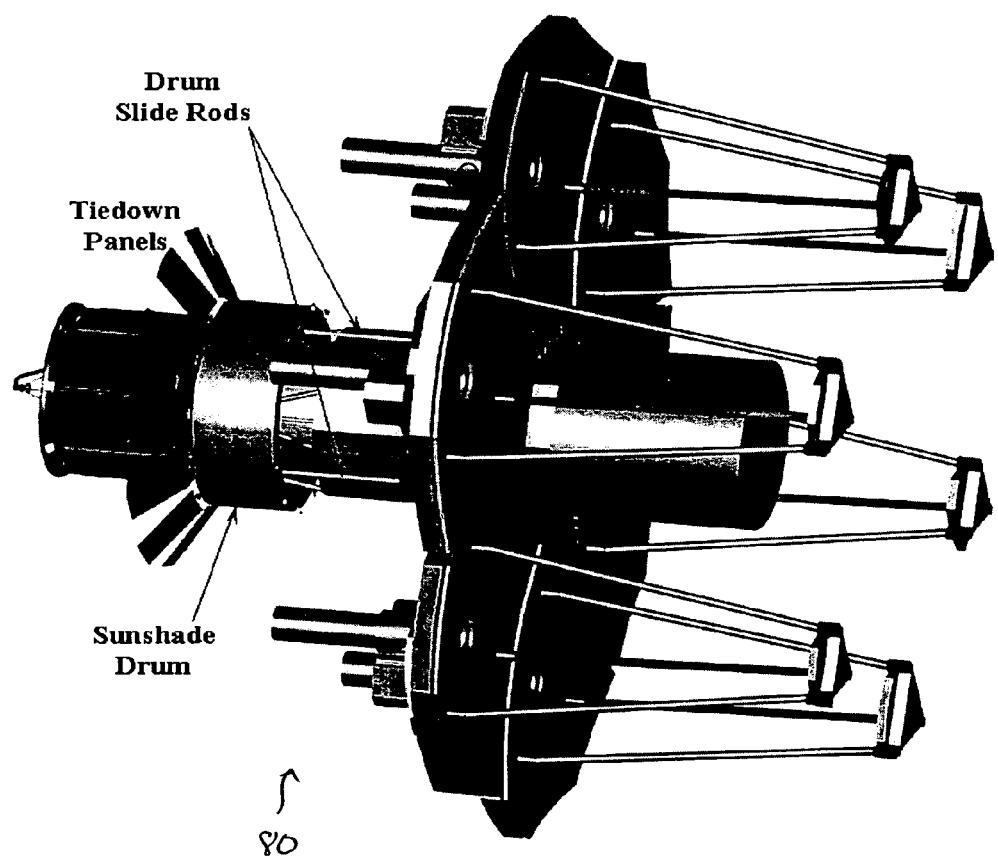
FIG. 4B shows an overall perspective view of a multi-aperture high-fill-factor telescope with associated mechanical support in a configuration for space deployment.
Figure 4C:
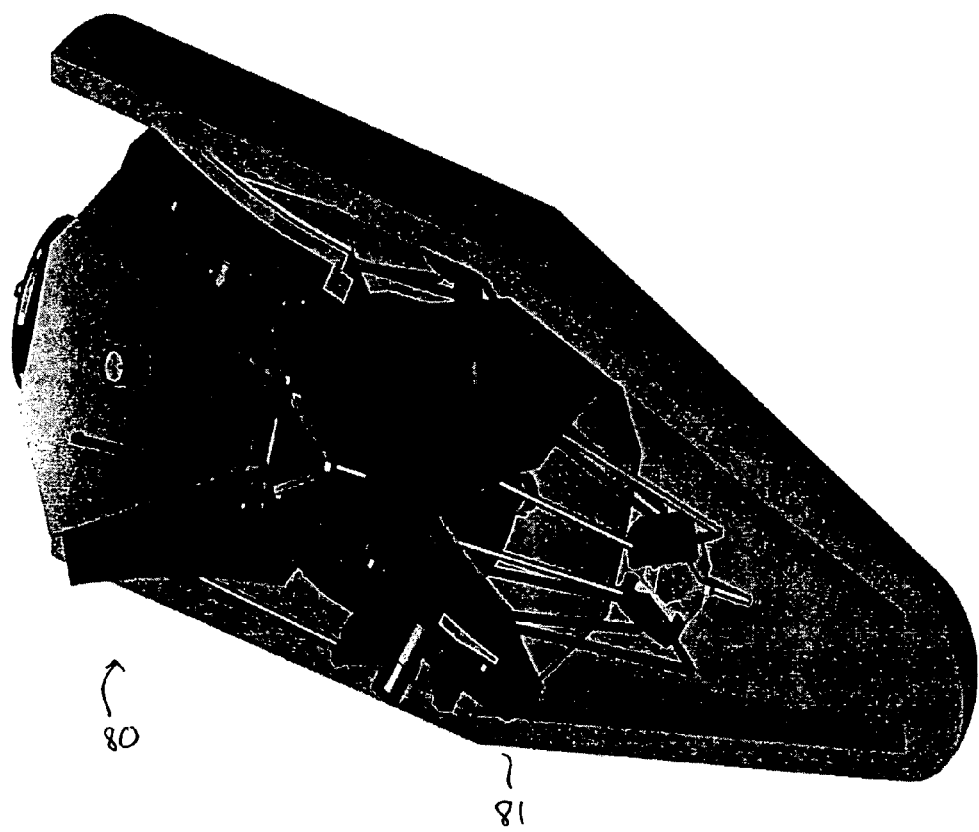
FIGS. 4C–4H show a time ordered sequence of events of a multi-aperture high-fill-factor telescope in various states of being deployed in space according to an embodiment of the present invention.
Figure 4D:
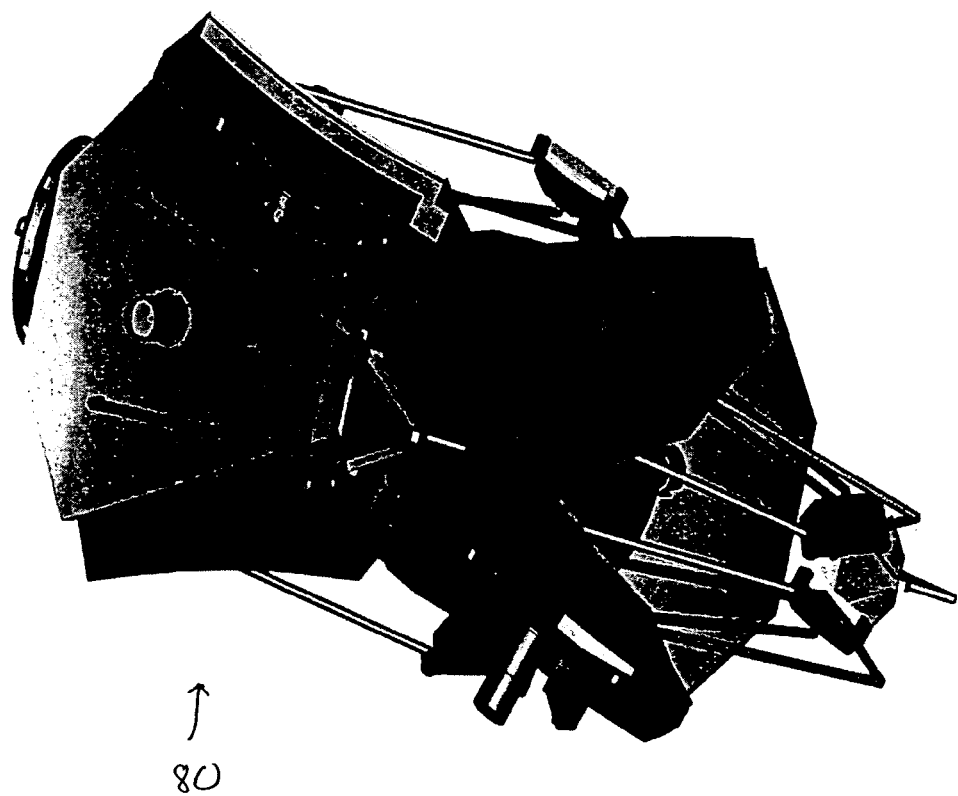
Figure 4E:
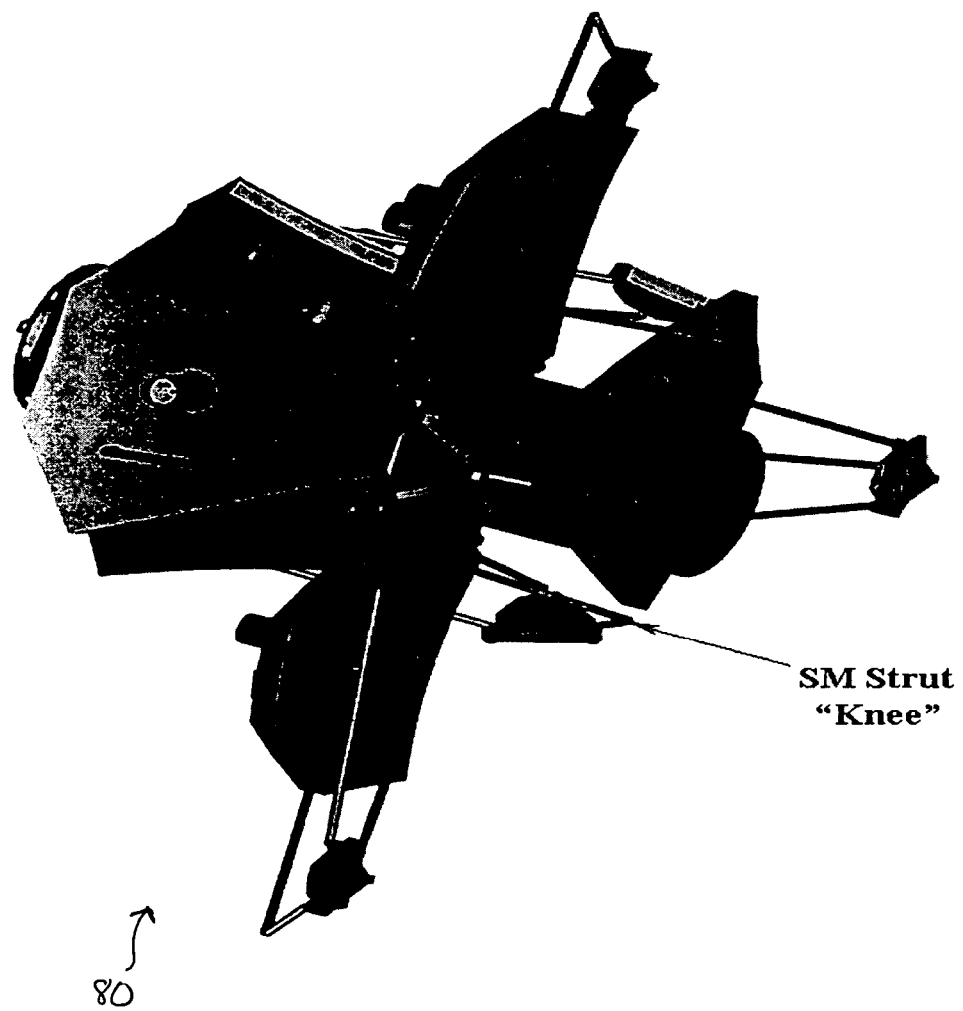
Figure 4F:
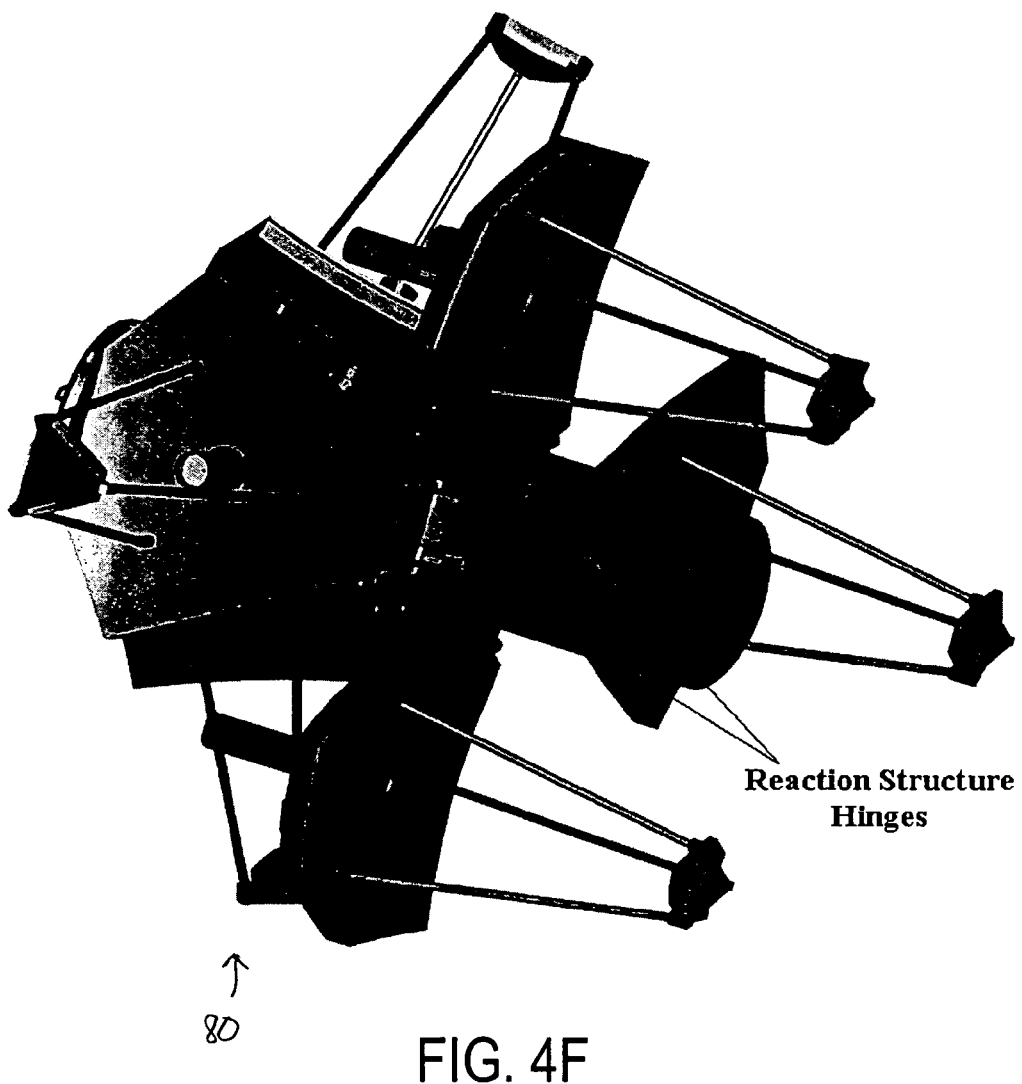
Figure 4G:
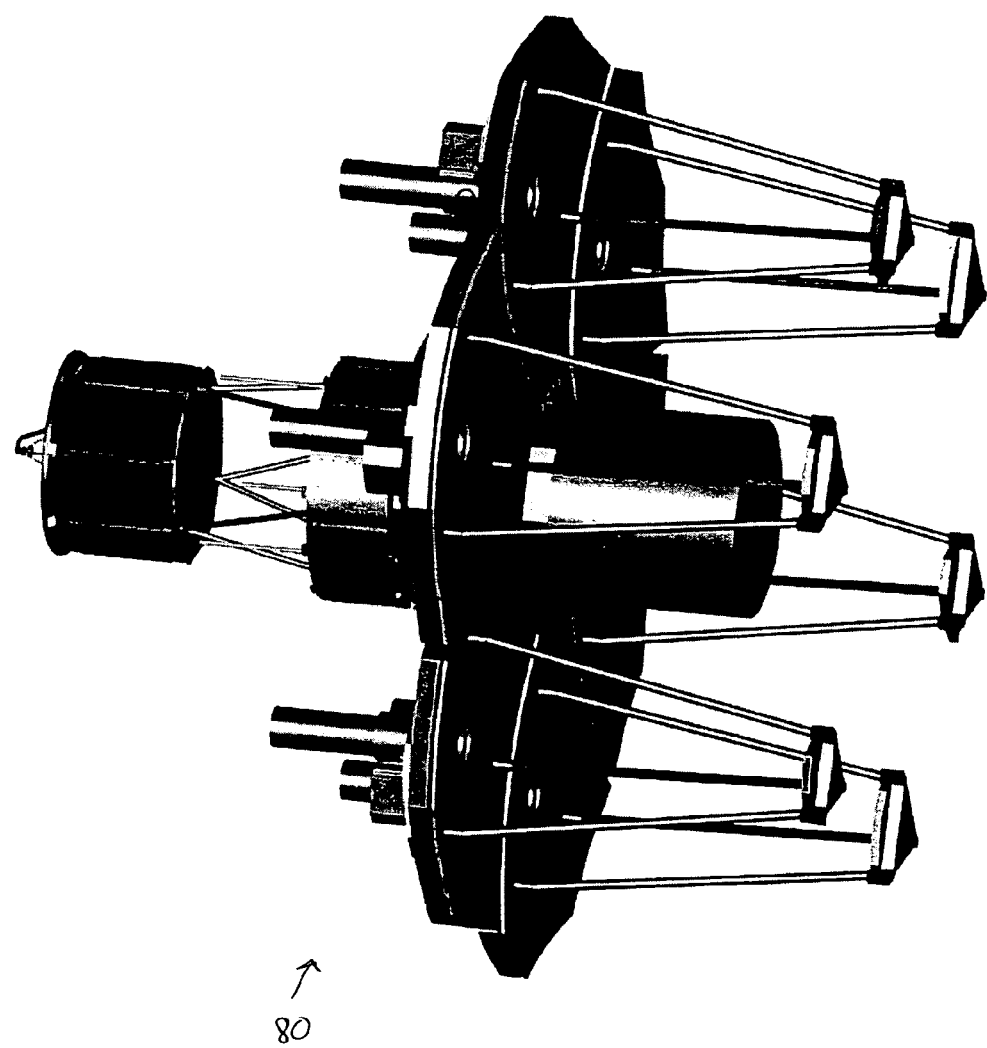
Figure 4H:
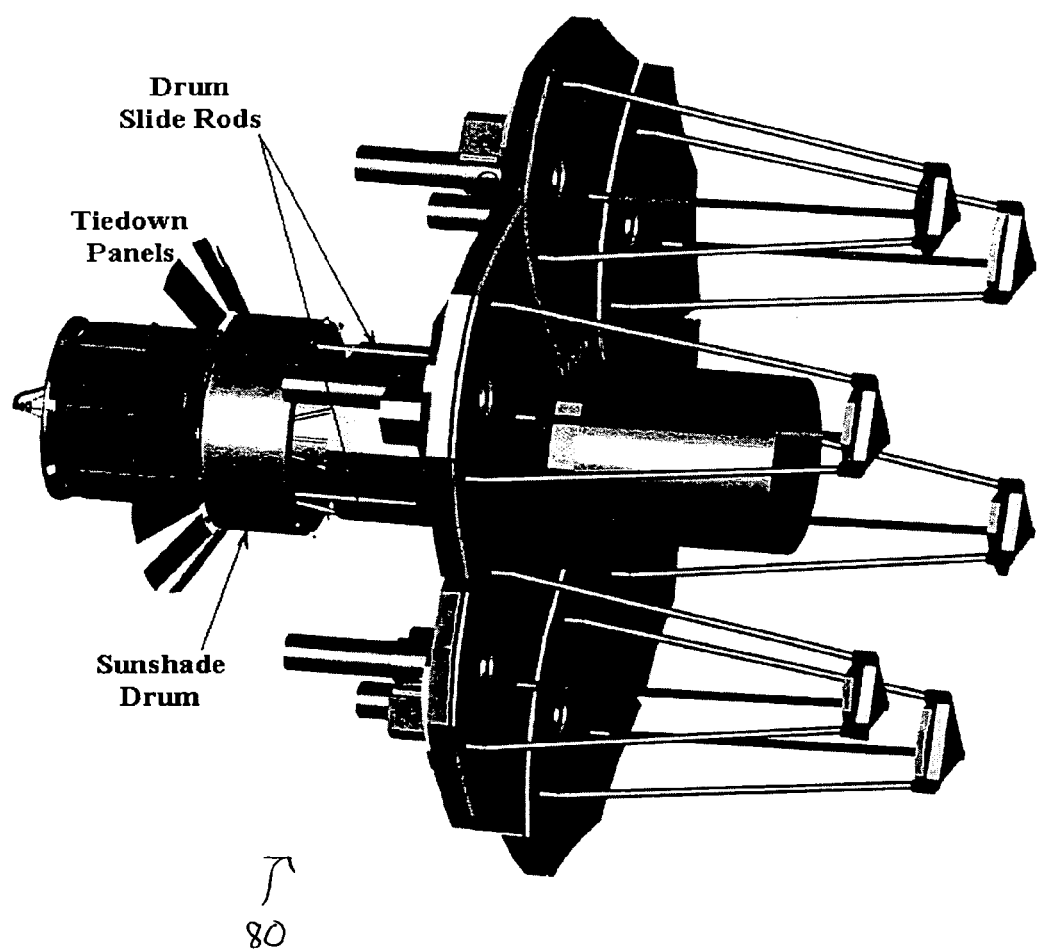

FIG. 4A is a simplified schematic of a multi-aperture high-fill-factor telescope 80 according to another embodiment of the present invention. Specifically, FIG. 4A shows a collector section that includes a number of sub-aperture telescopes that include reflective elements, a relay section that includes a plurality of flat fold mirrors, and a combiner section that includes a plurality of reflector devices that are configured to combine collected light and from an image on an image plane (discussed in further detail below). FIG. 4B is an overall perspective view of multi-aperture high-fill-factor telescope 80 with associated mechanical support in a configuration for space deployment. FIGS. 4C–4H show a time ordered sequence of events of multi-aperture high-fill-factor telescope 80 in various states of being deployed. These figures show multi-aperture high-fill-factor telescope 80 from an initial state of deployment (e.g., physically folded) in a protective capsule 81 to a fully deployed state (e.g., physically unfolded) according to an embodiment of the present invention. By providing a plurality of sub-aperture telescopes, which are mounted on mechanical systems that enable stowage in relatively small spaces (e.g. space rocket) and deploy in larger dispositions, the present invention achieves optical performance comparable to conventional telescope that may not be similarly stowed in such relatively compact spaces.

Referring again to FIG. 4A, multi-aperture high-fill-factor telescope 80 includes six sub-aperture telescopes 82, 84, 86, 88, 90, and 92. These sub-aperture telescopes form the collector section of telescope array 80. Each sub-aperture telescope may be an afocal telescope. Sub-aperture telescopes 82, 84, 86, 88, 90, and 92 respectively, include primary reflectors 93, 94, 96, 98, 100, and 102. Each primary reflector has a reflective surface that is configured to receive incoming light (or more generally electromagnetic radiation) from an object field, as indicated by the light rays (indicated by arrows). The incoming light gathered by each primary reflector is reflected back to a corresponding secondary reflector or element. In FIG. 4A, a secondary reflector 104 of sub-aperture telescope 86 is shown positioned in cooperative relationship with primary reflector 96; a secondary reflector 106 of sub-aperture telescope 88 is shown positioned in cooperative relationship with primary reflector 98; a secondary reflector 108 of sub-aperture telescope 90 is shown positioned in cooperative relationship with primary reflector 100; and a secondary reflector 110 of sub-aperture telescope 92 is shown positioned in cooperative relationship with primary reflector 102. For convenience, secondary reflectors associated with sub-aperture telescopes 82 and 84 are not shown in FIG. 4A, but may be similarly shaped and positioned as the secondary mirrors shown in FIG. 4A and may be disposed in cooperative relationships with their corresponding primary reflectors 93 and 94.

Each primary reflector has a reflecting surface that faces its corresponding secondary reflector. Each secondary reflector has a concave reflecting surface that directs light back through the primary reflectors to a corresponding tertiary mirror. The tertiary mirrors are numbered with reference number 116, 126, 146, 148, 150, and 152 in FIG. 4A. Each tertiary mirror is configured to collimate the light and direct the light to optically downstream relay section 54 and combiner section 56. Each reflector is sized and shaped to optimize performance and is configured to provide for stowage, launch, and deployment in space. In the illustrated embodiment, the primary and secondary reflectors are approximately hexagonal in shape. When deployed, the primary reflectors form a segmented primary reflector having a center opening 99.

A mechanical structure for supporting the primary and secondary reflectors in their stowed and deployed positions is shown in FIGS. 4C–4H. It is within the skill of one of ordinary skill in the art to manufacture the mechanical structures shown in these figures, which may vary dependent, for example, on the size and shape of the launch system (such as NASA's Space Shuttle cargo bay) and the desired capabilities and missions expected of the multi-aperture high-fill-factor telescope which incorporates the above-described optics.

The relay optics of the multi-aperture high-fill-factor telescope 80 include a plurality of reflector elements disposed on the backsides of the primary reflectors. For clarity of illustration, ray paths of collected light are not shown in FIG. 4A except for the initial incoming light from an object field. The following discussion provides a detailed description of the optical elements and optical path disposed subsequent to the sub-aperture telescopes.

The reflective surface of primary reflector 98 of sub-aperture telescope 88 is configured to collect light from a remote object and reflect the light toward the reflective surface of the secondary reflector 106. The secondary reflector 106 reflects the light through an aperture 112 formed primary reflector 98. The light passes through aperture 112, through a perforated flat fold mirror 114, and strikes a collimating tertiary mirror 116. Tertiary mirror 116 is configured to reflect the light back to perforated flat fold mirror 114, which is configured to reflect the light onto a trombone mirror pair 118. Trombone mirror pair 118 is coupled to an adjusting means (not shown) that is configured to provide path-length adjustments, image rotation, and other functions as needed to coherently combine the light from the various sub-aperture telescopes.

The upper mirror of trombone mirror pair 118 is disposed to reflect the light to a fixed flat fold mirror 120, which is disposed to reflect the light through a central aperture 99 formed by primary mirrors 82, 84, 86, 88, 90, and 92. On passing through central aperture 99, the light is collected and focused by a set of combiner elements that form the combiner section. The combiner section is assigned reference numeral 121. Flat fold mirror 120 may be an oversized mirror that can facilitate pupil-mapping adjustments.

Each of the other sub-aperture telescopes has a similar configuration of reflectors as the configuration described above. For example, for sub-aperture telescope 90, light from the same remote object is collected by the reflective surface of primary reflector 100 and is reflected toward the reflective surface of secondary reflector 108. Secondary reflector 108 directs light through an aperture 122 formed in primary reflector 100. The light passes through aperture 122, through a perforated flat fold mirror 124, and strikes a collimating tertiary mirror 126. The tertiary mirror 126 is configured to reflect the light back to the perforated flat fold mirror 124, which is configured to reflect the light onto trombone mirror pair 128. Trombone mirror pair 128 is coupled to an adjusting means (not shown) that is configured to provide path-length adjustments, image rotation, and other functions as needed to coherently combine the light from the various sub-aperture telescopes.

The upper mirror of trombone mirror pair 128 is disposed to reflect the light to a fixed flat fold mirror 130, which is disposed to reflect the light through central aperture 99. On passing through central aperture 99, the light is collected and focused by a set of combiner elements that form the combiner section. Flat fold mirror 130 may be an oversized mirror that can facilitate pupil-mapping adjustments.

For the next sub-aperture telescope 92, light from the same remote object is collected by the reflective surface of primary reflector 102 and is reflected toward the reflective surface of secondary reflector 110. Secondary reflector 110 directs light through an aperture 132 formed in primary reflector 102. The light passes through aperture 132, through a perforated flat fold mirror 139, and strikes a collimating tertiary mirror 146. Tertiary mirror 146 is configured to reflect the light back to the perforated flat fold mirror 139, which is configured to reflect the light onto trombone mirror pair 154. Trombone mirror pair 154 is coupled to an adjusting means (not shown) that is configured to provide path-length adjustments, image rotation, and other functions as needed to coherently combine the light from the various sub-aperture telescopes.

The upper mirror of trombone mirror pair 154 is disposed to reflect the light to a fixed flat fold mirror 162, which is disposed to reflect the light through central aperture 99. On passing through central aperture 99, the light is collected and focused by a set of combiner elements that form the combiner section. Flat fold mirror 162 may be an oversized mirror that can facilitate pupil-mapping adjustments.

For the next sub-aperture telescope 82, light from the same remote object is collected by the reflective surface of primary reflector 93 and is reflected toward the reflective surface of secondary reflector (not shown in FIG. 4A). The secondary reflector directs light through an aperture 134 formed in primary reflector 93. The light passes through aperture 134, through a perforated flat fold mirror 140, and strikes a collimating tertiary mirror 148. Tertiary mirror 148 is configured to reflect the light back to the perforated flat fold mirror 140, which is configured to reflect the light onto trombone mirror pair 156. Trombone mirror pair 156 is coupled to an adjusting means (not shown) that is configured to provide path-length adjustments, image rotation, and other functions as needed to coherently combine the light from the various sub-aperture telescopes.

The upper mirror of trombone mirror pair 156 is disposed to reflect the light to a fixed flat fold mirror 164, which is disposed to reflect the light through central aperture 99. On passing through central aperture 99, the light is collected and focused by a set of combiner elements that form the combiner section. Flat fold mirror 164 may be an oversized mirror that can facilitate pupil-mapping adjustments.

For the next sub-aperture telescope 84, light from the same remote object is collected by the reflective surface of primary reflector 94 and is reflected toward the reflective surface of secondary reflector (not shown in FIG. 4A). The secondary reflector directs light through an aperture 136 formed in primary reflector 94. The light passes through aperture 136, through a perforated flat fold mirror 142, and strikes a collimating tertiary mirror 150. Tertiary mirror 150 is configured to reflect the light back to the perforated flat fold mirror 142, which is configured to reflect the light onto trombone mirror pair 158. Trombone mirror pair 158 is coupled to an adjusting means (not shown) that is configured to provide path-length adjustments, image rotation, and other functions as needed to coherently combine the light from the various sub-aperture telescopes.

The upper mirror of trombone mirror pair 158 is disposed to reflect the light to a fixed flat fold mirror 166, which is disposed to reflect the light through central aperture 99. On passing through central aperture 99, the light is collected and focused by a set of combiner elements that form the combiner section. Flat fold mirror 166 may be an oversized mirror that can facilitate pupil-mapping adjustments.

For the next sub-aperture telescope 86, light from the same remote object is collected by the reflective surface of primary reflector 96 and is reflected toward the reflective surface of secondary reflector 104. Secondary reflector 104 directs light through an aperture 138 formed in primary reflector 96. The light passes through aperture 138, through a perforated flat fold mirror 144, and strikes a collimating tertiary mirror 152. Tertiary mirror 152 is configured to reflect the light back to the perforated flat fold mirror 144, which is configured to reflect the light onto trombone mirror pair 166. Trombone mirror pair 166 is coupled to an adjusting means (not shown) that is configured to provide path-length adjustments, image rotation, and other functions as needed to coherently combine the light from the various sub-aperture telescopes.

The upper mirror of trombone mirror pair 160 is disposed to reflect the light to a fixed flat fold mirror 168, which is disposed to reflect the light through central aperture 99. On passing through central aperture 99, the light is collected and focused by a set of combiner elements that form the combiner section. Flat fold mirror 168 may be an oversized mirror that can facilitate pupil-mapping adjustments.

The relay elements described above collectively provide relay functions for directing light collected by the individual sub-aperture telescopes to the combiner section. The combiner section is disposed between the primary reflectors and the secondary reflectors, and in particular is disposed at about the exit pupil of multi-aperture high-fill-factor telescope 80. The combiner section of multi-aperture high-fill-factor telescope 80 is described below in detail.

Figure 5:
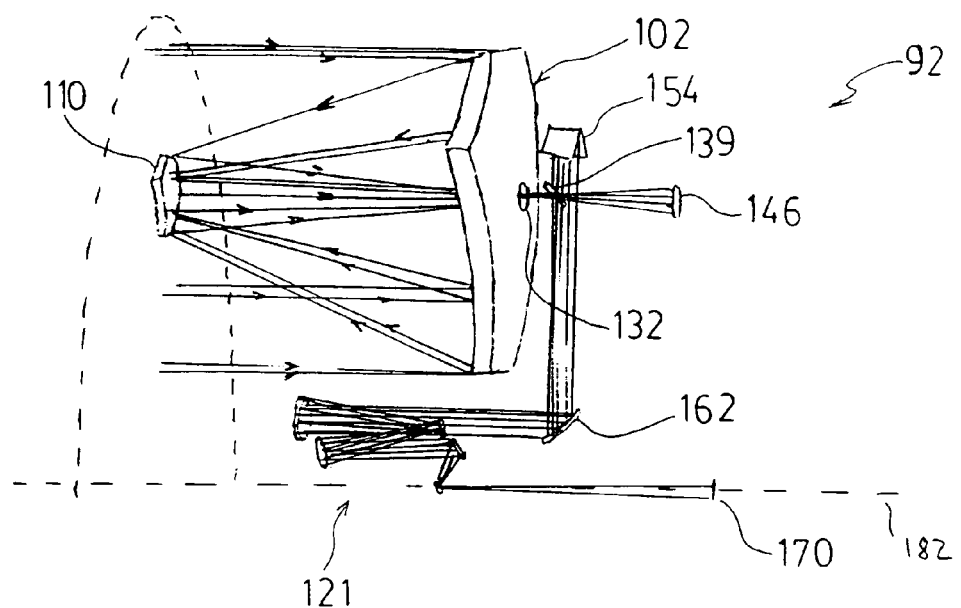
FIG. 5 shows an enlarged perspective view showing details of the combiner optics and relay optics according to an embodiment of the present invention.

FIG. 5 is a further detailed view of a portion of the relay elements forming the relay section of telescope 80 and a portion of the combiner elements forming the combiner section of telescope 80. The portions of the relay elements and combiner elements shown in FIG. 5 are associated with sub-aperture telescope 92. Light collected by sub-aperture 92 is transmitted through aperture 132 formed in primary mirror 102 and is transmitted through perforated flat fold mirror 139. Tertiary reflector 146 reflects the collected light back to the perforated flat fold mirror 139, which is configured to reflect the light to trombone mirror pair 154. Trombone mirror pair 154 reflects the light to flat fold mirror 162, which in turn reflects the light to combiner section 121. Combiner section 121 is configured to focus light collected by each sub-aperture telescope at image plane 170, which is located on optical axis 182.

Figure 6:
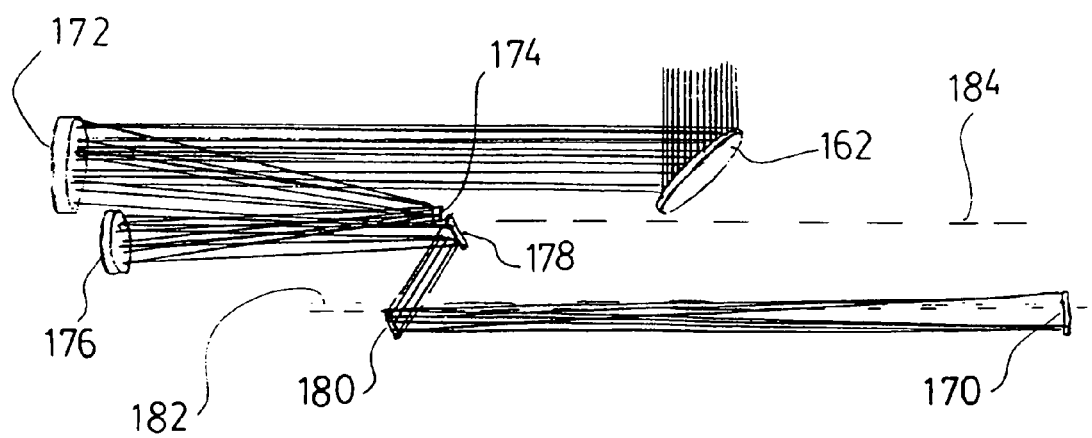
FIG. 6 shows a further enlarged perspective view of a portion of the combiner optics according to an embodiment of the present invention.

FIG. 6 shows a further detailed view the portion of combiner section 121 that is shown in FIG. 5 and shows the light path from flat fold mirror 162 to image plane 170. Light striking flat fold mirror 162 is reflected to a series of reflectors including a combiner primary reflector 172, a combiner secondary reflector 174, a combiner tertiary reflector 176, a flat fold mirror 178, and an exit pupil mirror 180. The system centerline, or optical axis, is designated by the reference numeral 182, which is displaced from a combiner centerline 184. The combiner elements are radially disposed about combiner centerline 184 for beam clearance. The beams from each sub-aperture telescope are combined in the exit pupil of telescope 80. The exit pupil is located at approximately exit pupil mirror 180.

Figure 7:
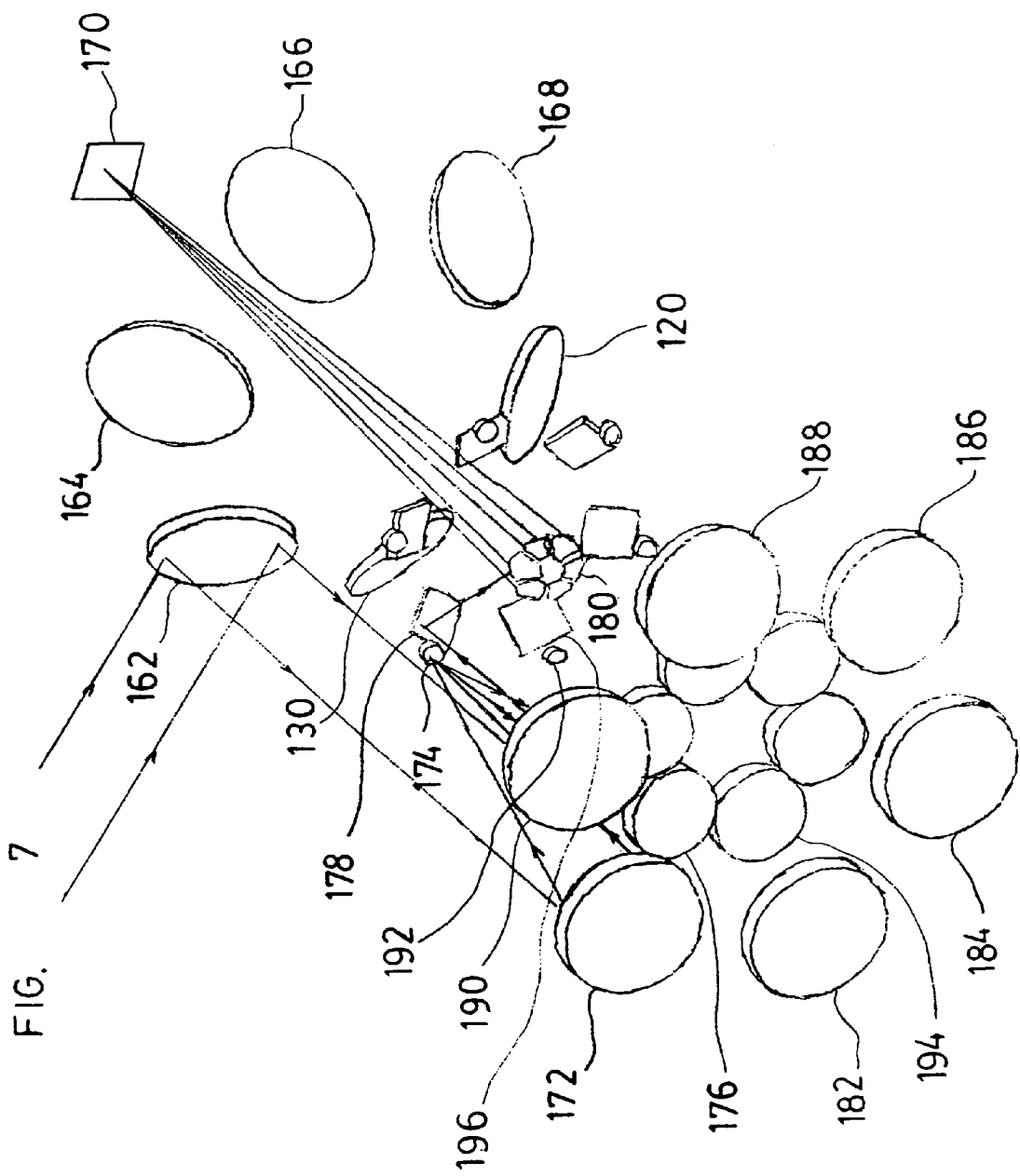
FIG. 7 shows a further enlarged perspective view of the combiner optics according to an embodiment of the present invention.

FIG. 7 shows combiner section 121 receiving light from relay flat fold mirrors 120, 130, 162, 164, 166, and 168. As can be seen in FIG. 7, light reflected by flat fold mirror 162 is directed to mirror 172, which in turn reflects the light to a smaller mirror 174. Mirror 174 in turn reflects the light to mirror 176. Light reflecting from mirror 176 is further reflected from flat fold mirror 178 and is directed to a corresponding one of a plurality of exit pupil mirrors 180. Exit pupil mirrors 180 are disposed in an array having a shape that is a scaled replica of the shape of an array formed by primary reflectors 82, 84, 86, 88, 90, and 92. In the illustrated embodiment, there are six exit pupil mirrors, each having a shape corresponding to that of the primary reflectors. The reflecting surfaces of the exit pupil mirrors reflect the light collected by the sub-aperture telescopes to image plane 170.

A similar arrangement of mirrors is provided to combine the incoming light of the flat fold mirrors 164, 166, 168, and 120, so that the light from the sub-aperture telescopes is combined at the exit pupils.

Figure 8:
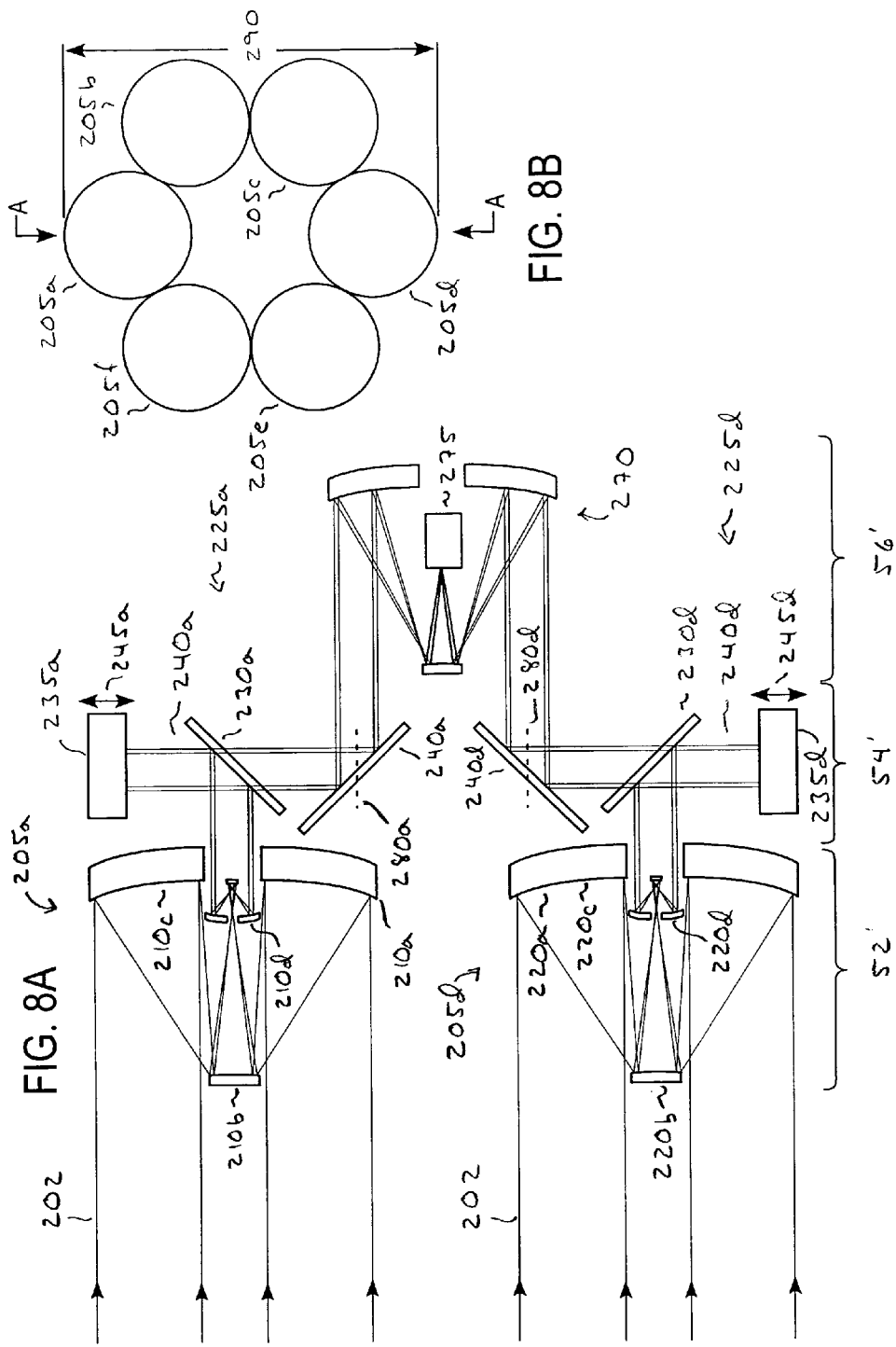
FIGS. 8A and 8B show cross-sectional and front views, respectively, of a multi-aperture high-fill-factor telescope according to another embodiment of the present invention.

FIGS. 8A and 8B show cross-sectional and front views, respectively, of a multi-aperture high-fill-factor telescope 200 according to another embodiment of the present invention. The cross-sectional view of multi-aperture high-fill-factor telescope 200 shown in FIG. 8A is a view along line A—A shown in FIG. 8B and is along a plane perpendicular to the page. Multi-aperture high-fill-factor telescope 200 differs from embodiments described above in that each sub-aperture telescope of telescope 200 includes at least four powered mirrors that have remotely located exit pupil. That is, the exit pupils are located optically behind their respective sub-aperture telescopes. Remotely locating the exit pupils optically behind the sub-aperture telescopes provides for a relatively high fill factor (e.g., up to about 80% fill factor).

Figure 9:
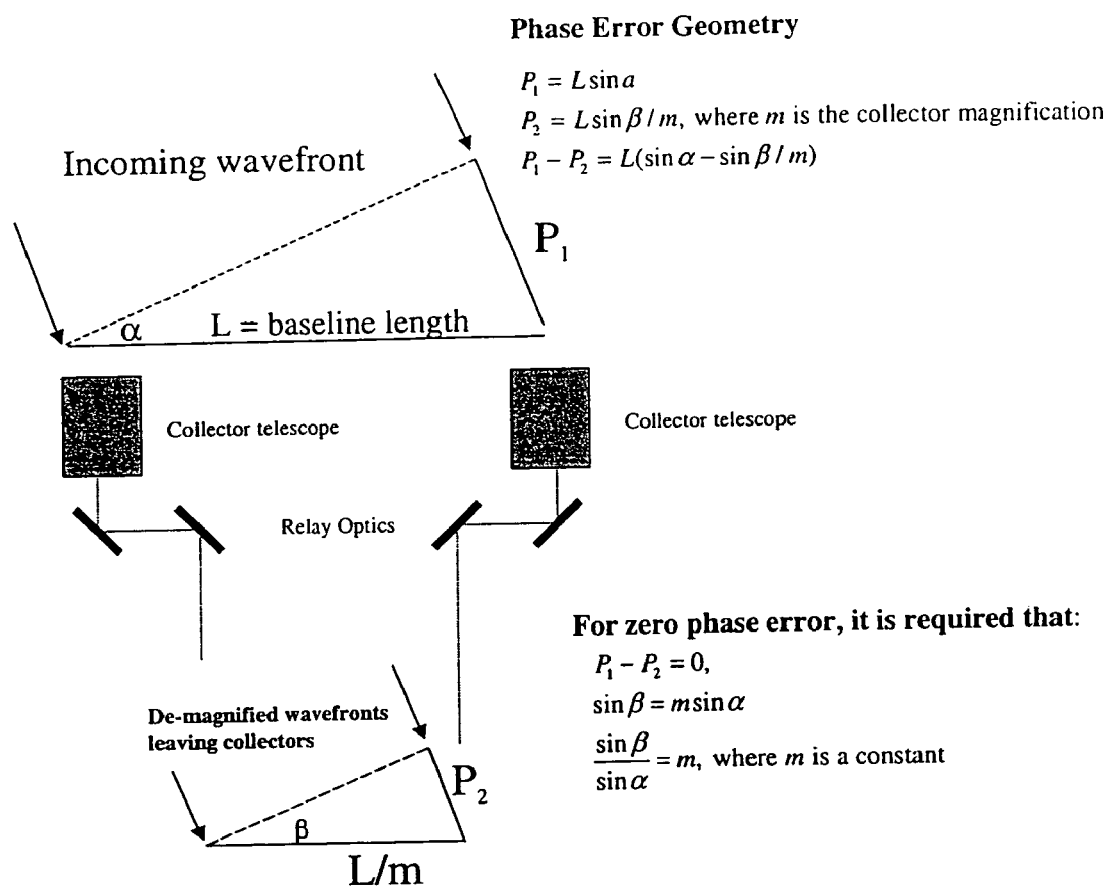
FIG. 9 is a simplified schematic of a multi-aperture high-fill-factor telescope showing the input field angle and the output field angle.

In the specific embodiment shown in FIGS. 8A and 8B, multi-aperture high-fill-factor telescope 200 includes a collector section 52', a relay section 54', and a combiner section 56'. Collector section 52' includes six sub-aperture telescopes, which are labeled with reference numeral 205*a*–205*f*. The sub-aperture telescopes are configured to collect electromagnetic radiation 202 (e.g., infrared radiation, visible light, ultraviolet radiation). According to one embodiment, each sub-aperture telescope has a phased field of view of about 0.5 degrees or less. While FIGS. 8A and 8B show an example of a multi-aperture high-fill-factor telescope that includes six sub-aperture telescopes, other embodiments may include fewer (e.g., four) or more (e.g., eight) than six sub-aperture telescopes. As mentioned briefly above, each sub-aperture telescope 205a–205f includes at least four powered mirrors. Powered mirrors, as referred to herein, are configured to reshape a wave front (e.g., focus or defocus a wave front) and typically have non-planar reflection surfaces. In the cross-sectional view of sub-aperture telescope 205a and 205d in FIG. 8A, the four powered mirrors of sub-aperture telescope 205a are labeled with reference numbers 210a–210d and the four powered mirrors of sub-aperture telescope 205d are labeled with reference numbers 220a–220d. As each sub-aperture telescope includes at least four powered mirrors, sufficient degrees of freedom are provided such that each sub-aperture telescope is configured to correct for sine magnification errors. Correction of sine magnification error implies that $\sin \alpha / \sin \beta = M$, such that M is the focal magnification ratio and is a constant, $\alpha$ is the input field angle, and $\beta$ is the output filed angle (see FIG. 9). Accordingly, separate phase error correctors, such as phase error corrector plates, may not be required for sine magnification error correction.

Figure 10:
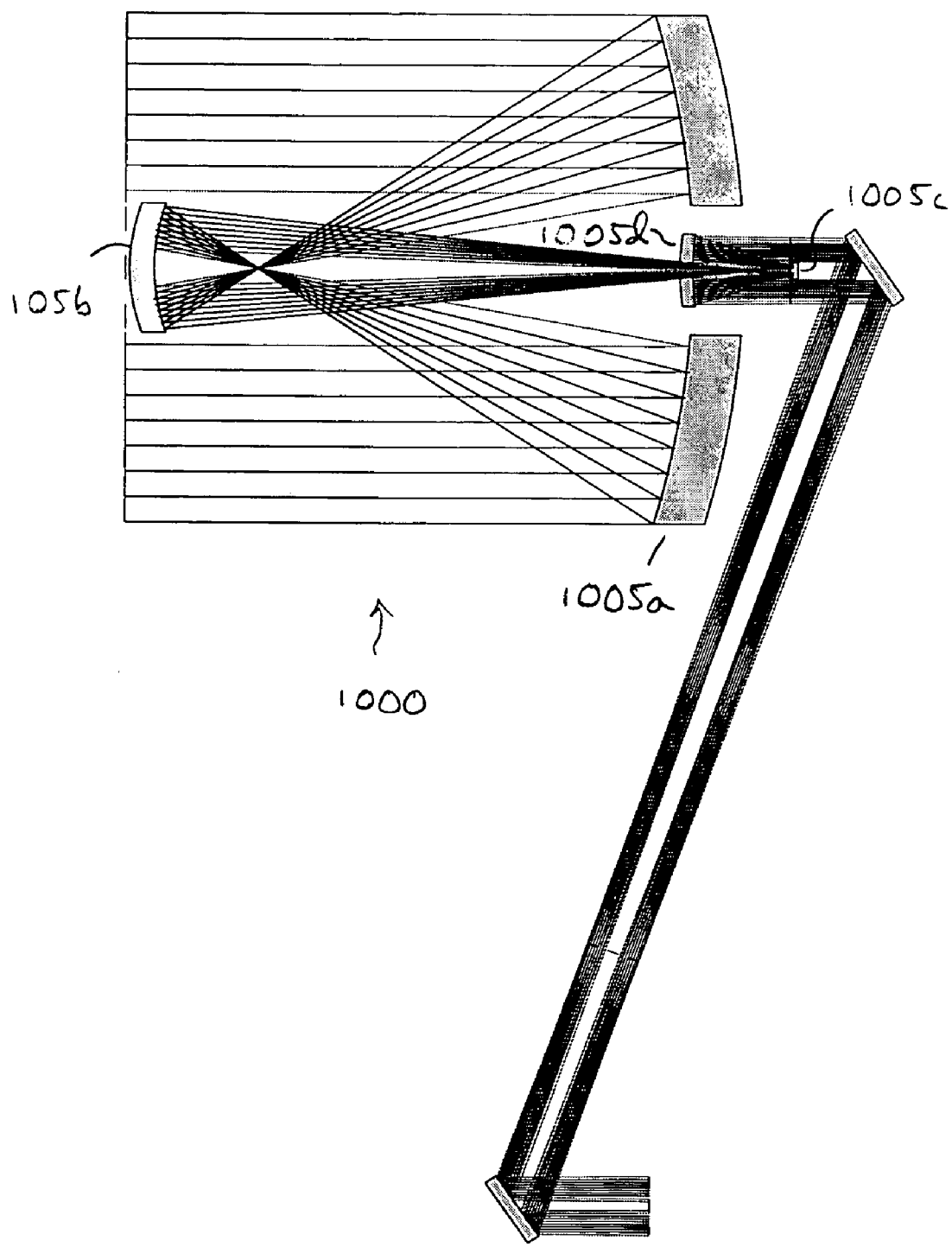
FIG. 10 shows a cross-sectional view of a sub-aperture telescope wherein the first and second powered mirrors form a Gregorian telescope and the third and fourth powered mirrors form a Cassegrain telescope according to an embodiment of the present invention.

According to one embodiment, the first and second powered mirrors (e.g., powered mirrors 210a and 210b) of each sub-aperture telescope form either a Cassegrain telescope or a Gregorian telescope and the third and forth powered mirrors (e.g., powered mirrors 210c and 210d) form a Cassegrain telescope. According to another embodiment, the first and second powered mirrors of each sub-aperture telescope form a Cassegrain telescope and the third and forth powered mirrors (e.g., powered mirrors 210c and 210d) form a Gregorian telescope. Cassegrain telescopes are typically characterized as including a primary mirror (e.g., powered mirror 210a) that is concave and a secondary mirror (e.g., powered mirror 210b) that is convex, and Gregorian telescopes are typically characterized as including a primary mirror that is concave and a secondary mirror that is concave. FIG. 10 shows a cross-sectional view of a sub-aperture telescope 1000 having first and second mirrors 1005a and 1005b, respectively, that form a Gregorian telescope and third and fourth mirrors 1005c and 1005d, respectively, that form a Cassegrain telescope. Each of the sub-aperture telescopes 205a–205f may be configured similarly to sub-aperture telescope 1000. Sub-aperture telescope 1000 is shown for purposes of example. Other four powered mirror telescope configurations may be used in embodiments of the present invention.

According to one embodiment, relay section 54' includes sets of relay optics that are configured to steer electromagnetic radiation 202 collected by the sub-aperture telescopes to combiner section 56'. As relay section 54' is configured to receive electromagnetic radiation from the sub-aperture telescope, the relay section is referred to herein as being disposed optically downstream of the sub-aperture telescopes. Similarly, combiner section 56' is referred to herein as being optically downstream of the collector section and the relay section.

Each sub-aperture telescope is associated with a unique set of relay optics included in relay section 54'. Two sets of relay optics 225a and 225d, which are respectively associated with sub-aperture telescopes 205a and 205d, are shown in cross-section in FIG. 8A. Four additional sets of relay optics associated with sub-aperture telescopes 205b, 205c, 205e, and 205f are not shown in FIG. 8A, but may be configured similarly to sets of relay optics 225a and 225d. Each set of relay optics may include a first flat fold mirror, a trombone mirror pair, and a last flat fold mirror. First flat fold mirrors associated with the sets of relay optics 225a and 225d are respectively labeled with reference numerals 230a and 230d. Trombone mirror pairs associated with the sets of relay optics 225a and 225d are respectively labeled with reference numerals 235a and 235d. Last flat fold mirrors associated with the sets of relay optics 225a and 225d are respectively labeled with reference numerals 240a and 240d.

A trombone mirror pair may include a set of flat fold mirrors that have reflective surfaces that are disposed at 90 degrees with respect to one another. Each trombone mirror pair may include a translation device (not shown) configured to move its associated trombone mirror pair along an adjustable optical path (e.g., adjustable optical paths 250a and 250d). Arrows 245a and 245d respectively show example directions along which trombone mirror pairs 235a and 235d may be moved. Translation devices of use may include piezoelectric devices, stacks of piezoelectric devices, solenoids, a combination of the foregoing or other like devices. Moving the trombone mirror pairs along their respective adjustable optical paths provides that the total optical pathlengths of each sub-aperture telescope can be made approximately equal (e.g., matched to within a few nanometers or less), thus reducing phase differences between the electromagnetic radiation collected by the sub-aperture telescopes.

According to one embodiment, combiner section 56' includes a combiner telescope 270 (sometimes generally referred to as a set of combiner optics) that is configured to combine the electromagnetic radiation collected by each sub-aperture telescope and form an image of a scene from which the electromagnetic radiation is transmitted. Images formed by combining the electromagnetic radiation may be collected by a detector 275 that is disposed approximately at an image plane 280. Detector 275 may include a CCD (charged coupled device) array, a CMOS (complimentary metal oxide) array or the like. Combiner telescope 270 may be configured as a Cassegrain telescope, a Gregorian telescope, a Newtonian telescope, or other useful design.

Figure 11:
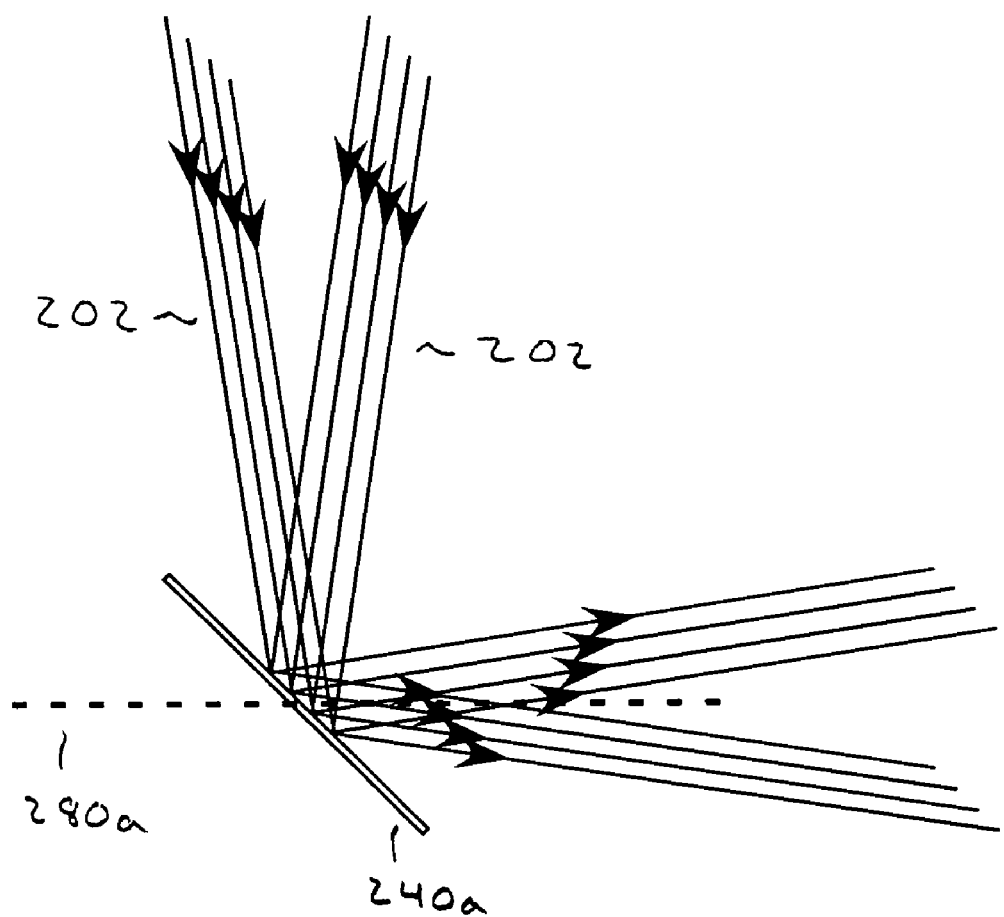
FIG. 11 is a simplified ray diagram of electromagnetic radiation focused at an exit pupil according to an embodiment of the present invention.

According to one embodiment, the exit pupils (images of the entrance pupils) of sub-aperture telescopes 205a–205f are located approximately at their associated last flat fold mirrors. In FIG. 8A the exit pupils associated with sub-aperture telescopes 205a and 205d are labeled with reference numerals 280a and 280d, respectively. FIG. 11 shows a simplified ray diagram of electromagnetic radiation 202 focused at exit pupil 280a according to an embodiment of the present invention. Last flat fold mirror 240a is shown located approximately at exit pupil 280a (e.g., within about one or two beam diameters of the exit pupil). According to one embodiment, the exit pupils are disposed approximately at a last flat fold mirror and optically behind a sub-aperture telescope's four powered mirrors. Exit pupils so disposed are referred to herein as being remotely located. According to another embodiment, an entrance pupil of combiner telescope 270 is located approximately at the exit pupils of sub-aperture telescopes 205a–205f (i.e., located at the last flat fold mirrors). According to another embodiment, the exit pupils of sub-aperture telescopes 205a–205f are located along optical paths of the sub-aperture telescopes, wherein the locations are about half the radius or more of an extended aperture 290 (see FIG. 8B) of the sub-aperture telescopes. The pattern presented to the combiner telescope by the last flat-fold mirrors is a scaled down version of the entrance pupil pattern formed by the sub-aperture telescopes. The scale factor between these two patterns is the afocal magnification ratio of the sub-aperture telescopes, (see the above sine magnification error discussion).

Multi-aperture high-fill-factor telescopes described herein are configured to generate relatively high-resolution images at their respective image planes, such that little or no electronic filtering (e.g., Weiner filter) is performed on the images. As little or no electronic filtering is performed, relatively little or no optical information collected from a scene is lost in such electronic filtering.

The above described multi-aperture high-fill-factor telescopes, which include a number of sub-aperture telescopes are configured to provide a fill factor similar to that of single collector telescopes having similar diameter entrance apertures. Multi-aperture high-fill-factor telescopes described herein are configured to provide fill factors of up to approximately 80% or higher. Unlike sparse aperture telescopes (i.e., telescopes having fill factors less than about 50%) designs, combining the electromagnetic radiation collected by the sub-aperture telescopes is performed at an exit pupil. Such design provides for relatively high fill factors (e.g., up to about 80% or higher).

It is to be understood that the examples and embodiments described above are for illustrative purposes only and that various modifications or changes in light thereof will be suggested to persons skilled in the art and are to be included within the spirit and purview of this application and scope of the appended claims. For example, the illustrated embodiment described herein may have entrance pupil of up to eight meters or more. Additionally, while a number of embodiments have been described that include either refractive optics or reflectors, other embodiments may include combinations of refractive optics and reflectors. Therefore, the above description should not be taken as limiting the scope of the invention as defined by the claims.

What is claimed is:

1. A multi-aperture high-fill-factor telescope comprising:
   a plurality of sub-aperture telescopes, each sub-aperture telescope being configured to collect electromagnetic radiation from a scene and including first, second, third, and fourth powered mirrors;
   a set of combiner optics configured to combine electromagnetic radiation collected by the sub-aperture telescopes to form an image of the scene; and
   a plurality of sets of relay optics, the sets of relay optics being respectively associated with the sub-aperture telescopes, each set of relay optics including a first flat fold mirror, a trombone mirror pair, and a last flat fold mirror, wherein the last flat fold mirrors are disposed within about a beam diameter of respective exit pupils from the respective exit pupils of the sub-aperture telescopes.

2. The multi-aperture high-fill-factor telescope of claim 1, wherein the last flat fold mirrors are disposed substantially symmetrically about a central axis.

3. The multi-aperture high-fill-factor telescope of claim 1, wherein each of the first and second powered mirrors of the sub-aperture telescopes form a first Cassegrain telescope and each third or fourth powered mirrors of the sub-aperture telescopes form a second Cassegrain telescope.

4. The multi-aperture high-fill-factor telescope of claim 1, wherein each of the first and second powered mirrors of the sub-aperture telescopes forms a Gregorian telescope and each third and fourth powered mirrors of the sub-aperture telescopes form a Cassegrain telescope.

5. The multi-aperture high-fill-factor telescope of claim 1, wherein each of the first and second powered mirrors of the sub-aperture telescopes forms a Cassegrain telescope and each third and fourth powered mirrors of the sub-aperture telescopes form a Gregorian telescope.

6. The multi-aperture high-fill-factor telescope of claim 1, wherein the set of combiner optics forms a combiner telescope.

7. The multi-aperture high-fill-factor telescope of claim 6, wherein the exit pupils are located about at an entrance pupil of the combiner telescope.

8. The multi-aperture high-fill-factor telescope of claim 1, wherein the exit pupils are located about at the last flat fold mirrors.

9. The multi-aperture high-fill-factor telescope of claim 1, wherein the first, second, third, and fourth powered mirrors of each telescope are configured to correct for sine magnification errors.

10. A multi-aperture high-fill-factor telescope comprising:
    a plurality of sub-aperture telescopes, each sub-aperture telescope including at least first, second, third, and fourth powered mirrors and an exit pupil disposed optically remote from an associated sub-aperture telescope;
    a plurality of sets of relay optics disposed optically downstream from the plurality of sub-aperture telescopes, each set of relay optics including a first flat fold mirror, a trombone mirror pair, and a last flat fold mirror, wherein each last flat fold mirror is disposed within about a beam diameter of an associated exit pupil from the associated exit pupil; and
    a combiner telescope disposed optically downstream from the sets of relay optics.

* * * * *